United States Patent [19]

Carlson

[11] 4,005,999
[45] Feb. 1, 1977

[54] VAPOR REACTOR
[76] Inventor: Drexel T. Carlson, 2909 W. 93rd St. Terrace, Leawood, Kans. 66206
[22] Filed: Mar. 3, 1975
[21] Appl. No.: 554,631
[52] U.S. Cl. .................... 55/93; 55/95; 55/226; 55/244; 55/261; 55/267; 261/119 R; 261/125; 261/DIG. 54
[51] Int. Cl.² ........................ B01D 47/02
[58] Field of Search ........... 55/84, 93, 95, 226, 55/244, 247, 248, 261, 263, 83, 222, 239, 249, 266, 267, 269; 261/119 R, 125, DIG. 54, 16, 17

[56] References Cited

UNITED STATES PATENTS

| | | | |
|---|---|---|---|
| 130,545 | 8/1872 | Cartwright et al. | 55/93 X |
| 283,025 | 8/1883 | Rowan | 55/244 X |
| 415,646 | 11/1889 | Kusnezov | 261/119 R |
| 626,569 | 6/1899 | Sergeant | 55/261 |
| 716,380 | 12/1902 | Clawson | 261/119 R |
| 809,383 | 1/1906 | Lowe | 55/244 X |
| 978,739 | 12/1910 | Briegel et al. | 55/244 |
| 1,508,294 | 9/1924 | Reeves | 55/244 X |
| 1,524,333 | 1/1925 | Brandt et al. | 261/119 R |
| 2,360,981 | 10/1944 | Rupp | 55/248 X |
| 2,409,558 | 10/1946 | Gonn | 261/119 R |
| 3,386,229 | 6/1968 | Reed | 55/248 X |
| 3,563,029 | 2/1971 | Lowes | 261/119 R |

FOREIGN PATENTS OR APPLICATIONS

| | | | |
|---|---|---|---|
| 308,444 | 4/1937 | Italy | 261/119 R |

*Primary Examiner*—Frank W. Lutter
*Assistant Examiner*—David L. Lacey
*Attorney, Agent, or Firm*—Thomas M. Scofield

[57] ABSTRACT

Improvements in air pollution control and polluted gas effluent treatment, both processes and apparatus; Processes and devices for sequentially several times drawing a polluted gas stream against a liquid surface under a barrier approaching the liquid surface, while adding ambient air to the stream between impacts; Processes and devices for humidifying a polluted gas stream by first drawing the stream in impact against a liquid body surface, thereafter nucleating the humidified gas stream by adding ambient air thereto, and finally again drawing the now nucleated gas stream into impact against a liquid body surface to remove the polluting particulates therefrom; Single vessel and multiple vessel multi-stage processes of treating polluted gas streams by drawing same into first impacting humidification, thereafter ambient air addition-nucleation followed by further draw-through impaction.

30 Claims, 8 Drawing Figures

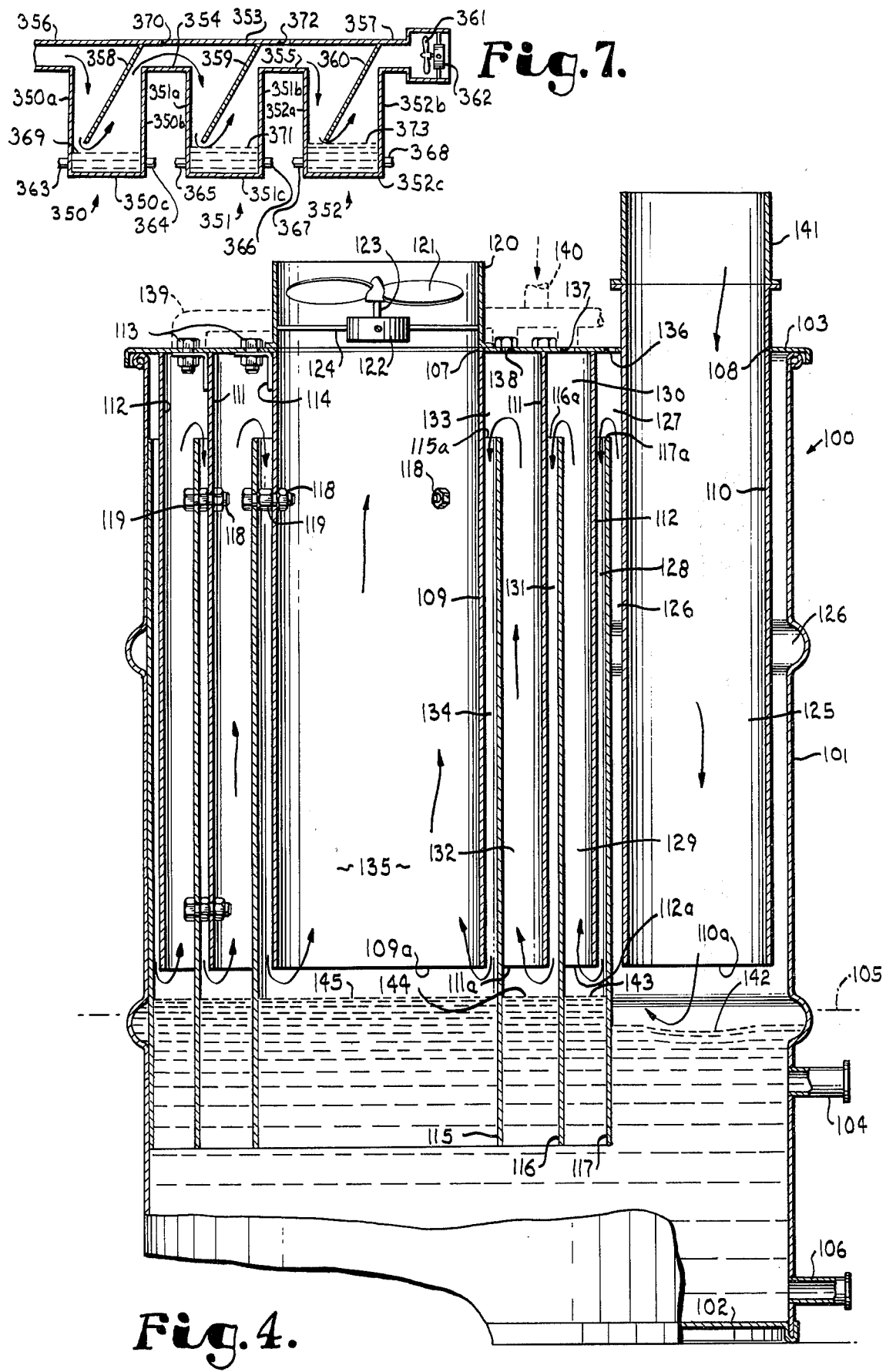

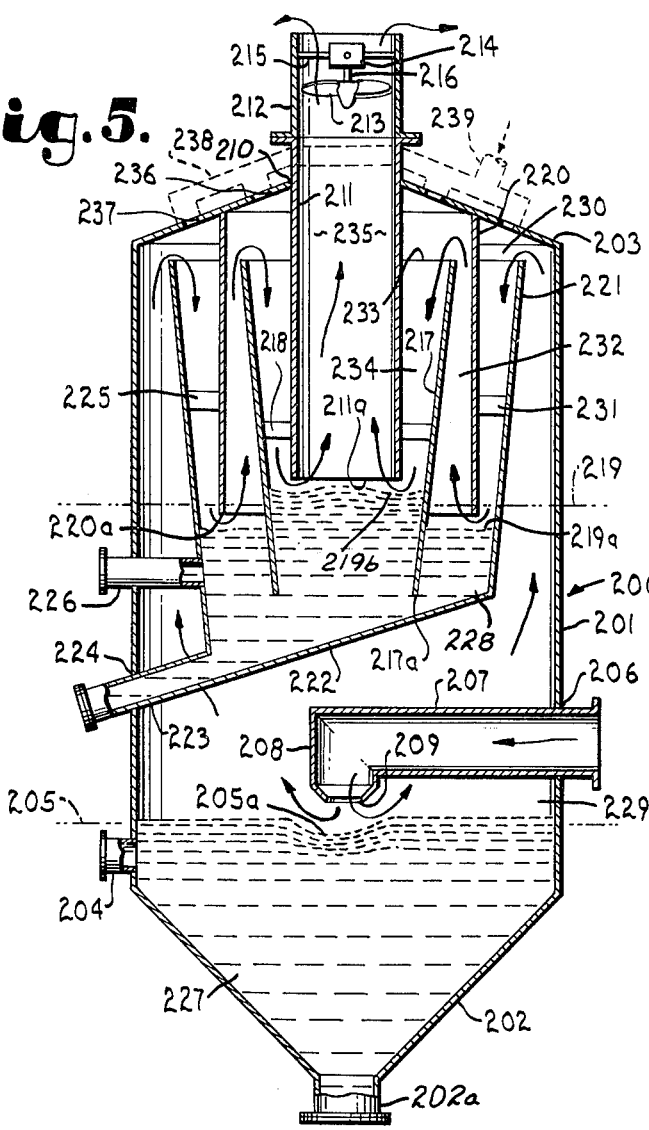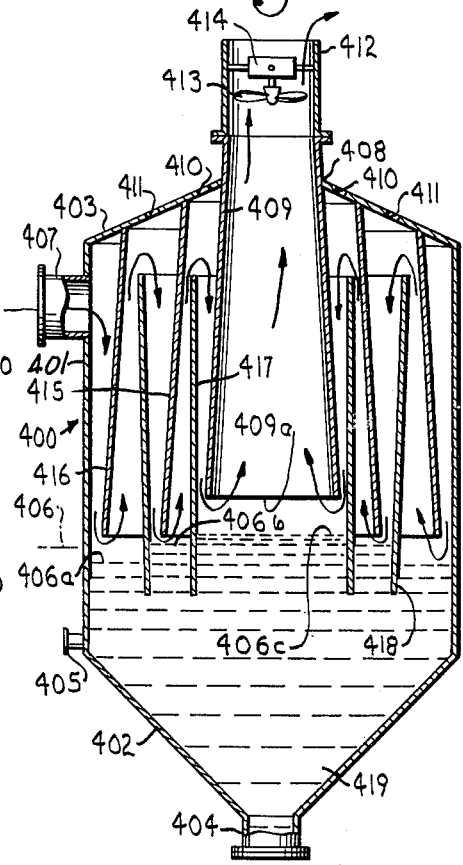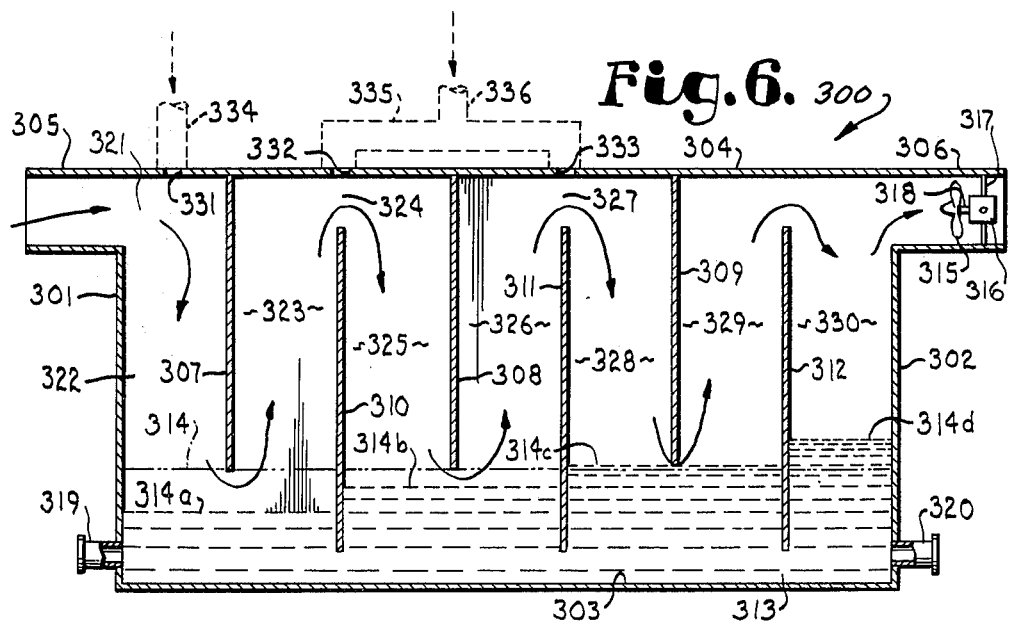

VAPOR REACTOR

PRIOR ART

I am aware of the following patents and publications showing gas washers, scrubbers and the like relating to the subject improved method and apparatus. The instant process and apparatus are, particularly, an improvement over the air pollution control devices and scrubbers illustrated and described in the Air Pollution Engineering Manual of the United States Department of Health, Education and Welfare, 1967, Pages 804–806, inclusive and FIGS. 587 and 588 and the U.S. Pat. No. 2,360,981 to Rupp issued Oct. 24, 1944 for "Dust Collector".

I also note the following United States patents which relate to a forcing a polluted effluent or gas under multiple barriers positioned over a water surface:

Grieve Ser. No. 585,568 issued June 29, 1897 for "Apparatus for Purifying Air",

Steese et al Ser. No. 715,519, issued Dec. 9, 1902 for "Blast Furnace", and

Lloyd Ser. No. 973,120, issued Oct. 18, 1910 for "Gas Scrubbers".

Further, with respect to the question of adding ambient air to a stream of contaminated effluent or gas in scrubbers and air pollution control devices, I note:

Green Ser. No. 605,280, issued June 7, 1898 for "Smoke Condenser";

Irvin Ser. No. 3,063,686, issued Nov. 19, 1962 for "Smoke Purifier";

Krantz Ser. No. 3,138,441, issued June 23, 1964 for "Gas Purification Apparatus";

Eng et al U.S. Pat. No. 3,494,099, issued Feb. 10, 1970 for "Method of and Apparatus for Purifying Polluted Gases".

OBJECTS OF THE INVENTION

An object of the instant invention is to provide improved air pollution control methods and apparatus for practice thereof which are applicable to the polluted effluents of many industrial processes.

Another object of the invention is to provide such improved methods and apparatus for practice thereof utilizing ambient, cleaner, atmospheric air and water in such manner as to most effectively cleanse polluted effluents from numerous industrial processes.

Another object of the invention is to provide methods of and means for effectively treating polluted gas and air effluents from industrial processes and the like, which processes and apparatus utilize input ambient air wherein the ratio of ambient air utilized may be as little as 1.5 volumes thereof per 10 volumes of polluted air processed in the means utilized and the method practiced.

Another object of the invention is to provide novel means for and methods of effectively treating polluted gas and air effluents from industrial processes and the like, the improvements particularly lending themselves to either or both of parallel and series stagings of the inventive novel process steps and apparatus embodiments thereof.

Another object of the invention is to provide such improved means for and methods of effectively treating polluted gas and air effluents from industrial processes and the like, wherein said polluted effluents are efficiently and maximally treated and cleaned by processes and apparatus utilizing a very minimum quantity and amount of time, energy, space and apparatus.

Another object of the invention is to provide such improved means for and methods of cleansing polluted effluents wherein the water or other scrubbing fluid or liquid utilized within the particular means and in the practice of the process is employed in a single body which is continuously and conveniently situated for continuous or periodical discharge to waste, cleansing, clarification, filtering, purification and/or recycle to parallel or series stages of the device or process, as may be required.

Another object of the invention is to provide new and improved means for and methods of effectively and continuously cleansing very polluted industrial process effluents and the like over long periods of time, without the requirement of continuous maintenance, repair and down time in the apparatus and devices or component parts thereof.

Still another object of the invention is to particularly provide very modestly sized and reasonably priced air pollution control means and devices which, although in effect providing and utilizing a multiplicity of steps, are so packaged and arranged as to provide highly effective commercial and engineering results in this very difficult field in some of the most challenging pollution effluents and environments known to man.

Another object of the invention is to provide a variety of highly effective apparatus embodiments of a novel process of treating polluted industrial effluents and the like, the particular apparatus embodiments applicable to solving of particular problems in the air pollution control field, less expensive designs being usable with less challenging pollution problems.

Another object of the invention is to provide new and improved means of and methods for efficiently cleansing and cleaning from highly polluted effluents even the smallest or finest sizes of polluting particles generated in the many and varied industrial processes now on the scene.

Another object of the invention is to provide such improved processes for and means of cleansing polluted industrial effluents and the like which means are so constructed that the parts thereof are readily available for replacement and repair, as well as inspection.

A further object of the invention is to provide an optimum form of the apparatus and process embodiment involving the drawing (fan on the outlet) of air from a vessel wherein, via reversing passageways, a contaminated effluent is impacted at least two and preferably more times on the surface of a body of water of cleansing liquid. Because the effluent is drawn from the vessel (fan on the effluent outlet thereof), it is additionally possible to draw in ambient air to parts of the vessel away from the liquid surface as the contaminated effluent is pulled through the channels or passageways within the vessel.

Other and further objects of the invention will appear in the course of the following description thereof.

In the drawings, which form a part of the instant specification and are to be read in conjunction therewith, embodiments of the invention are shown and, in the various views, like numerals are employed to indicate like parts.

FIG. 4 is a view taken along the line 4—4 of FIG. 3 in the direction of the arrows.

FIG. 5 is a vertical section through another modification of an improved device or apparatus for treating polluted gas containing particulate matter.

FIG. 6 is a vertical section through another modification of improved means or apparatus for treating polluted gas containing particulate matter, this showing essentially schematic in form.

FIG. 7 is a vertical section through a device constructed and operating like that of FIG. 6, but wherein the impaction chambers for the polluted effluent are contained in separate vessels, rather than individual chambers of a single vessel.

FIG. 8 is a vertical section through a device constructed and operating like the device of FIG. 1 but wherein the flow is reversed (peripheral input of contaminated effluent with central output of clean gas).

FIGS. 1 AND 2

Figure 1:
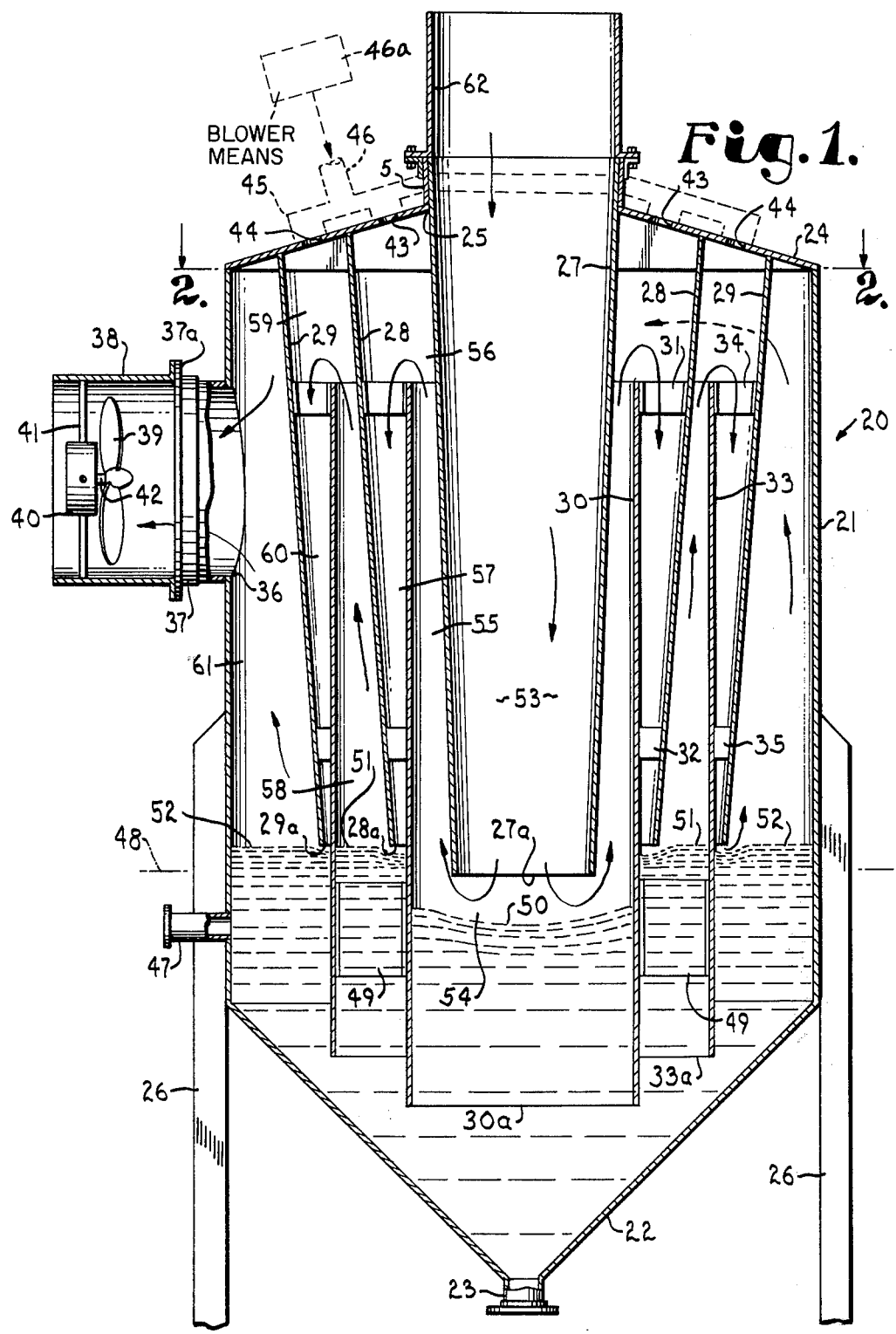
FIG. 1 is a vertical sectional view through an air pollution control or polluted gas treating device wherein the polluted effluent to be cleaned is input centrally to the vessel, with the cleansed, once polluted, effluent withdrawn peripherally from the device.
Figure 2:
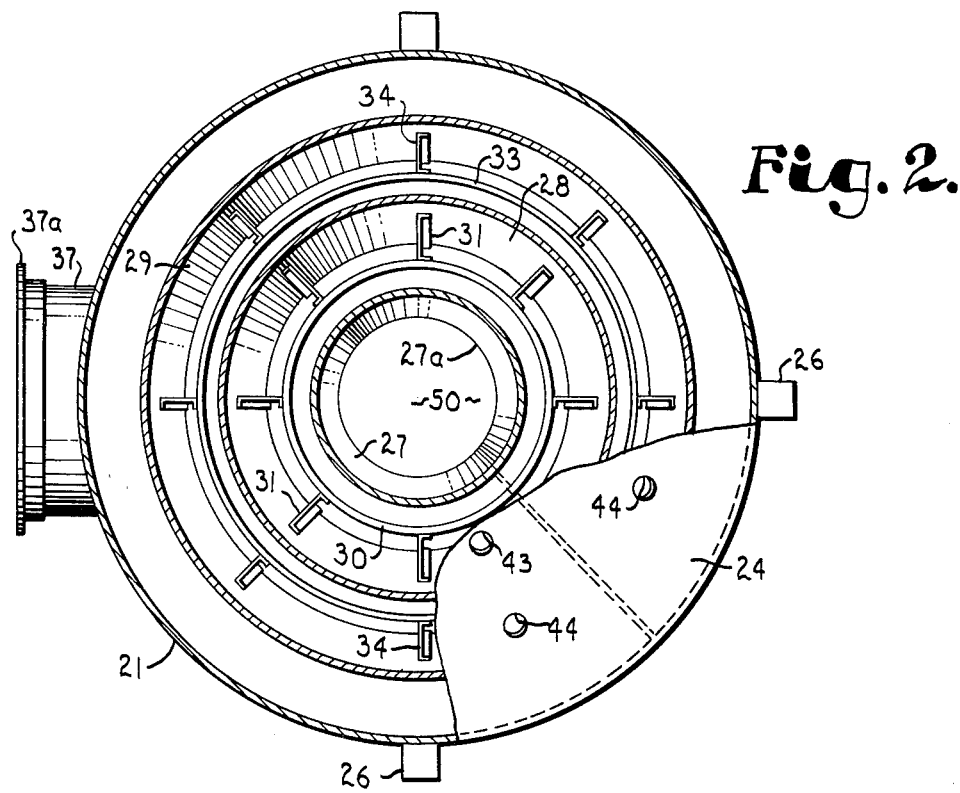
FIG. 2 is a view taken along the lines 2—2 of FIG. 1 in the direction of the arrows.

Referring to FIGS. 1 and 2, therein is shown an air pollution control device or scrubber wherein, in a single vessel, there are provided a plurality of operative process steps which act to cleanse a polluted effluent having objectionable particulate matter therein. In the device of FIGS. 1 and 2, the said polluted gas is drawn into a duct or passageway positioned centrally of the vessel. This continuously indrawn stream of polluted gas is first impacted against a first surface of a body of liquid in order to humidify the polluted gas stream, as well as at least partially remove the largest particles carried thereby therefrom. After the said first impact, the polluted, now humidified gas is drawn through reversing passageways to a second impaction on a second surface of a body of liquid. Before the said second impaction, ambient air (typically at lower temperature and lower humidity than the humidified, particulate carrying polluted gas stream) is added in a continuous stream to the once impacted gas stream in order to supersaturate and nucleate this stream. With the fine particulate thus agglomerated into larger particles, the humidified, ambient air mixed stream is then drawn into the said impact against a second liquid body, after which it is further drawn through reversing passageways to a third and final impaction on another surface of a liquid body. Before this third stream impaction, the once humidified (by first impaction), supersaturated and nucleated (by first ambient air addition), partially particle purged (by second impaction) stream preferably receives a second input stream of ambient air to further and again supersaturate and nucleate the particulate matter still remaining therein. After being impacted for a third and final time on the surface of a body of liquid in order to remove the final quantities of agglomerated particulate therefrom, the treated and clean gas is drawn out of the reaction vessel and passed to atmosphere or to whatever space or environment is to receive it.

Turning to the structural description of the vessel, device and reactor of FIGS. 1 and 2, at 20 is generally designated a reaction vessel having, in the specific form shown, a cylindrical, vertical side wall 21, a frusto-conical lower or bottom wall 22 tapering downwardly to discharge fitting 23 and upwardly angled frusto-conical top wall 24 having central opening 25 therethrough. Any suitable structural support beams or members 26 may be provided fixed to side wall 21 to support vessel 20 in vertical position.

Mounted vertically within opening 25 and preferably of downwardly tapering frusto-conical configuration is central duct or tube 27 which is mounted through and connected to wall 24 by cylindrical collar 5. Spaced concentrically outboard from central tube 27 are two preferably inwardly and downwardly tapered, inverted, frusto-conical tube sheets 28 and 29 which are welded or otherwise fixedly attached at their upper ends to the underside of top wall 24. The length of tube sheets 28 and 29 is preferably slightly less than the length of tube 27. Mounted between central duct 27 and tube sheet 28 is vertical, cylindrical duct 30 which is mounted on and spaced with respect to tube sheet 28 by spacers 31 (upper) and 32 (lower). Cylindrical duct 30 extends well below the lower end of central duct 27. Outboard of cylindrical tube or duct 30 and positioned between tube sheets 28 and 29, concentric therewith, is a second cylindrical tube or duct 33 which is mounted inboard of tube sheet 29 and fixed thereto by upper spacers 34 and lower spacers 35. Duct 33 extends well below the lower ends of central duct 27 and tube sheets 28 and 29, but is of lesser length than the lower end 30a of duct 30, as seen as 33a.

Opening 36 is provided in side wall 21 intermediate the upper and lower ends of tube sheet 29 with output fitting 37 of conventional form connected thereto. A conduit 38 having fan 39 therewith operative to draw air or gas through the vessel is mounted on flange 37a of fitting 37. Motor 40 is mounted in conduit 38 by spider members 41, driving shaft 42 to rotate the fan blades 39. Fan 39 may be a centrifugal blower or any suitable air moving means to draw air through the entire vessel 20: in through central duct 27, then via reversing passageways radially (circumferentially) outwardly for exit through opening 36, fitting 37 and conduit 38.

It should be understood that more than one opening 36, fitting 37 and conduit 38, including fan means 39, may be provided spaced around the peripery of the vessel 30, whereby to obtain a minimum air velocity on gas exit. If there is more than one opening, fitting and conduit, as well as air moving means 39, they will be spaced equidistant from one another on the side wall 21. This lowered exit velocity minimizes water carryover.

There are provided a plurality of spaced (from one another), circumferential (around opening 25) openings or holes 43 through top wall 24 communicating into the space or zone between innermost tube 27 and tube sheet 28 above the upper end of cylindrical duct 30. Likewise, there are preferably provided a plurality of circumferential, spaced openings or holes 44 through top wall 24 between tube sheets 28 and 29 communicating into the zone or space above the upper end of duct 33. A manifold (dotted lines) 45 may be provided overlying the top wall 24 in the area of said openings 43 and 44 and encircling the central duct 27. If such manifold is provided, an input flow line (or plurality of same) 46 is provided whereby to blow or impel ambient air into the openings 43 and 44 by any conventional fan or blower means 46a. Ordinarily, the latter means will not be required as the fan or fans 39 will draw the desired quantity of ambient air into the vessel during operation of the system therewithin for the process as previously described and as to be further described hereinafter.

Water or liquid make-up line 47 is provided communicating through the side wall 21 of vessel 20 below the preferred starting liquid level 48 which is preferably substantially at the lowermost end 27a of central tube or duct 27. Suitable additional spacers 49 are provided communicating between cylindrical ducts 30 and 33 below said water level 48, spaced well below the lower ends 28a and 29a of tube sheets 28 and 29.

The operational levels of the liquid or water in the vessel are shown at 50 centrally of duct 30 below center tube 27, at 51 centrally of tubes or ducts 30 and 33 below lower end 28a of tube sheet 28, and at 52 between cylindrical tube 33 and outer wall 21 below the lower end 29a of tube sheet 29.

For descriptive purposes, the zone interior of tube 27 is numbered 53, the zone below the lower end 27a of tube 27 54, the annulus between tube 27 and duct 30 55, and the space or zone above duct 30 56.

The zone between duct 30 and tube sheet 28 is designated 57, the zone between tube sheet 28 and duct 33 58, the zone above duct 33 between tube sheets 28 and 29 59, that zone between duct 33 and tube sheet 29 60 and, finally, the zone outboard of tube sheet 29 and inside of side wall 21 is designated 61.

The horizontal section of the vessel of FIG. 1 is not necessarily circular. That is, it may be square, hexagonal or the like. Circular is optimum. This is also true of the vessels of FIGS. 4, 5 and 8.

FIG. 1 AND FIG. 2 OPERATION

In the operation of the device illustrated in FIGS. 1 and 2, the vessel is filled with water or other cleansing liquid, mixtures of liquids, or the like preferably to the level 48. A conduit 62 carrying the polluted gas (typically an effluent from an industrial process) having objectionable particulate material therein is connected to the upper end of central tubes 27. The fan or fans 39 in conduit or conduits 38 is energized into operation, thus drawing gas through the vessel 20.

Assuming that the liquid in the lower portion of vessel 20 is water, the drawing of gas through the vessel and out thereof through opening 36 creates a rarefaction which lowers, somewhat, the boiling point of the liquid in question. The process will be described with respect to a polluted gas effluent incoming to the vessel at a temperature of over the boiling point of the liquid in the vessel under the conditions of rarefaction. If there were atmospheric pressure in the vessel, this temperature would be substantially 212° F at sea level.

The inwardly drawn, downwardly moving, polluted, objectionable particulate carrying gas is impacted in a continuous stream on the surface of the water inside of duct 30. Once the process reaches equilibrium, the water level is driven roughly down to the point indicated at 50. This impaction, plus the expansion from the nozzle end 27a of duct or tube 27 saturates or substantially saturates (humidifies) the hot gas stream, in effect, with steam particles. As this humidified, substantially saturated gas is drawn upwardly into the decreasing volume zone 55, it is at a considerably lesser temperature than it was before the impaction on the liquid surface 50.

Passing out the upper portion of zone 55, the continuously outwardly drawn stream of humidified gas expands into the zone 56 above duct 30 where it continuously receives an inwardly drawn (or forced) stream of ambient air. This ambient air is at a temperature lower (generally considerably lower) than the temperature of the humidified gas stream and, at this point, the polluted gas stream is transformed from a state of substantial saturation to supersaturation, with nucleation and agglomeration of the particulate matter therewithin into larger particles.

This supersaturated, nucleated, agglomerated gas stream, containing ambient air drawn or forced in through openings 43, is drawn downwardly into decreasing volume zone 57 for a second impaction on the water surface 51. In this impaction, the nucleated, agglomerated particles are to a considerable extent taken up by the water in the zone between ducts 30 and 33. The gas, which continues to move from the impact area under zone 57 upwardly into the decreasing volume zone 58 is, by the impaction, additionally humidified and again substantially saturated moves upwardly into the throat of zone 58 and out into the zone 59 above duct 33.

In zone 59, again, the substantially humidified, partially cleansed gas stream is met by an incoming flow of indrawn or inforced ambient air, such still at a lower temperature than the humidified gas stream. For a second time, in zone 59, there is nucleation and agglomeration of particulate carried in the gas stream because of supersaturation caused by the mixing of the humidified main gas stream with the second input ambient flows through openings 44.

This now twice nucleated gas flow is drawn downwardly into the zone 60 and then impacted for a third and last time upon the water surface 52, whereby to knock out or lose the last nucleated and agglomerated objectionable particulate into the water or liquid between outer wall 21 and duct 33. Thereafter, the cleansed gas flow, containing both the original effluent input through duct 27 and the ambient air indrawn or inflowed through openings 43 and 44 passes out through opening 36 in wall 21 and into conduit 38 drawn by fan or blower 39.

In the event that additional humidification of the input contaminated gas flow is desired, steam may be added in conduit 62 or duct 27 before impaction on water surface 50. In order to continuously remove the objectionable particulate from the gas flow being drawn through the vessel 20, the water or cleansing liquid is continuously renewed by input through fitting 47 and withdrawal through bottom fitting 23.

DEVICE OF FIGS. 3 AND 4

Figure 3:
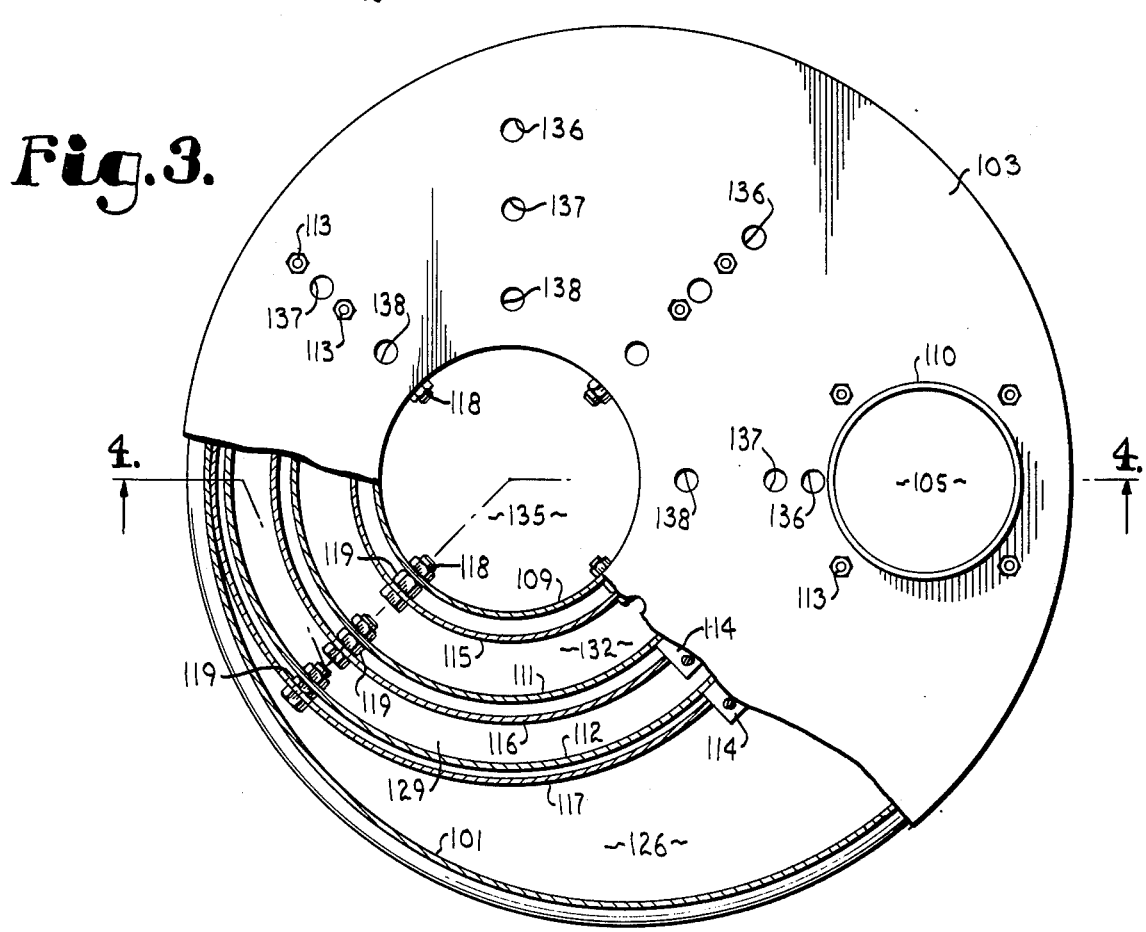
FIG. 3 is a plan view with the top cover broken away to illustrate the internal construction of a second device for treating polluted gas containing particulate matter or apparatus for air pollution control. In this device the polluted effluent to be cleaned is input peripherally to the vessel, with the cleansed effluent withdrawn centrally thereof.

Referring to FIGS. 3 and 4, therein is shown a device which functions in substantially the same manner as the device of FIGS. 1 and 2 except that instead off a peripheral exhaust or withdrawal (cleansed) gas from the treating vessel or reactor, as in FIGS. 1 and 2 and the instant device the treated (cleansed) gas is exhausted substantially centrally of the vessel.

Referring, then, to FIGS. 3 and 4, therein is illustrated a vessel generally designated 100 having (in the specific form shown) a cylindrical vertical side wall 101, a bottom wall 102 and a top wall 103. Side wall 101 has liquid input flow line 104 positioned thereon preferably located below the starting liquid line 105. Additionally, there is provided liquid output or drain line 106 on side wall 101. Top wall 103 has outlet opening 107 and inlet opening 108 therethrough operative to receive elongate cylindrical effluent tube or duct 109 and elongate cylindrical input flow tube or duct 110, respectively.

There may be provided a plurality of openings 108 to receive a plurality of input ducts 110 for flowing contaminated gas containing objectionable particulate matter into the vessel 100 for treating therewithin. In such case the openings 108 and ducts 110 would be positioned closely adjacent one another.

Concentrically positioned around effluent flow duct or tube 109 are cylindrical tubes or ducts 111 and 112 which are fixed (like duct 109) to the top wall 103 by suitable bolt (113) secured fasteners or hangers 114 in conventional manner. The length of tube sheets or ducts 112 and 111 are preferably substantially the same as effluent and inlet ducts 109 and 110, respectively, namely, normally ending somewhat above the starting liquid level 105.

Three cylindrical tubes, sheets or ducts 115, 116 and 117 are rigidly fixed concentrically outwardly of ducts or tube sheets 109, 111, and 112, respectively, by conventional means such as bolts 118 carrying spacers 119 thereon. Cylindrical tubes or ducts 115–117, inclusive extend considerably below the start-up water level 105 and terminate, at their upper ends 115a–117a, respectively, short of top wall 103.

Discharge conduit 120 has fan 121 mounted therein driven by motor 122 through shaft 123. The fan assembly is mounted in conduit 120 by spider members 124. Any suitable air moving means such as the fan shown, a centrifugal blower, etc., may be used.

Flow zones in the vessel are defined as follows. Zone 125 is the interior of duct 110. Zone 126 is that zone exterior of duct 117 and below the upper edge 117a thereof. Zone 127 is immediately above and inboard of top end 117a of duct 117 (inboard with respect to effluent duct 109). Zone 128 is between duct 117 and tube sheet 112. Zone 129 is between tube sheet 112 and duct 116. Zone 130 is between sheet 112 and duct 111 above sheet 116. Zone 131 is between sheet 111 and duct 116.

Zone 132 is between tube sheet 111 and duct 115. Zone 133 is between tube sheet 111 and effluent duct 109 above duct 115. Zone 134 is between duct 115 and effluent duct 109. Zone 135 is inside of effluent duct 109.

There are provided concentrically arranged sets of ambient air input openings above the ducts 117, 116 and 115 as seen at 136, 137 and 138. Specifically, that is, ambient air input openings 136 permit ambient air to be drawn or forced into zone 127. Openings 137 permit ambient air to be input or drawn into zone 130. Openings 138 permit ambient air to be drawn in or forced into zone 133.

Finally, there may be provided a manifold (dotted line showing of FIG. 4) generally designated 139 having one or more input lines 140 for forcing ambient air into the said zones 127 and 130 and 133 through openings 136, 137 and 138, respectively. Such forcing is done by a conventional fan or blower, not seen, of little required force because of the fact that the air movement through vessel 100 is drawn, not blown.

FIG. 3 and FIG. 4 OPERATION

In operation of the device of FIGS. 3 and 4, water or other cleansing liquid is input through line 104 is substantially the level shown at 105. Motor 122 is energized, thus driving fan or blower 121 to exhaust air upwardly from zone 135 inside effluent duct 109. This draws gas and air or polluted effluent through the vessel for cleansing and purification as now will be described. It is also assumed that a conduit 141 is connected to the upper inlet end of input tube or duct 110 to feed polluted gas containing objectionable particulate matter into the reactor or device 100 from whatever source, such as an industrial process.

The input polluted gas, with objectionable particulate is drawn by fan or blower 121 downwardly in zone 125 of duct 110 to impact upon the water or cleansing liquid, driving same downwardly to a level generally indicated at 142. This impaction, particularly in the case of a hot polluted gas humidifies, saturates or near saturates the polluted input gas, which then passes into zone 126 surrounding, or substantially surrounding duct 117. As this humidified, near saturated and preferably saturated polluted gas passes into zone 127 above the upper end 117a of duct 117, it is contacted by an inwardly forced or drawn stream of ambient air at a lower temperature than the humidified polluted gas. This contact causes supersaturation, nucleation and agglomeration of the particulate matter remaining in the gas after the first impact on the water surface at 142.

Because of the rarefaction of atmosphere within the vessel 100 caused by the drawing through of the polluted gas to be treated, it is understood that the boiling point of the liquid (such as water, chemically treated water, mixtures of water and other liquids, and the like) is less than it would be at atmospheric pressure, as was the case in the device of FIGS. 1 and 2. The supersaturated moving gas stream, now mixed with a quantity of input ambient air, together with the at least partially agglomerated and nucleated particulate therein passes into zone 128 between duct 117 and tube sheet 112. At the bottom of this zone 128, a second impaction takes place, at the modified water level 143, where some of the agglomerated, nucleated particulate is removed, the gas is further humidified and the temperature thereof is again lowered, as was the case in the first impaction at water level 142. (The first impaction at 142 serves to remove larger particulate, if present.)

The humidified gas from the impaction at 143 passes up into zone 129 between tube sheet 112 and duct 116 (drawn at all times by the fan 121) moving into the zone 130. In zone 130, a fresh, continuous, injection of additional ambient air is received, the ambient air drawn in by the fan 121 action or forced therein, whereby again to supersaturate the flowing humidified gas stream, thereby to again agglomerate and nucleate particulate carried therein. This combined partially cleansed-still polluted gas stream, injected (twice) with ambient air, then passes into zone 131 between duct 116 and tube sheet 111 downwardly to impact for a third time on a liquid surface at modified level 144. At this point additional agglomerated, nucleated particle knock-out takes place into the water below tube sheet 111, as well as rehumidification or additional humidification of the gas stream and further lowering of the temperature thereof.

The further cleansed gas stream, containing input ambient air, humidified, moves up into zone 132 drawn by fan or blower 121. It then passes into the last ambient air injection zone 133 where a final (continuous) injection of ambient air takes place to finally supersaturate, agglomerate and nucleate the remaining particulate therewithin. This gas, with the agglomerated, nucleated particulate and additional ambient passes into zone 134 downwardly to a final impaction at a modified water level 145. A final loss of agglomerated, nucleated particulate takes place in this water below effluent duct 109 with the cleansed gas then passing into zone 135 and out conduit 120.

It is understood that ambient air may be input at only one of the zones 127, 130 and 133, only two of same or all three of same.

In the event that it is desired to additionally humidify the input polluted gas containing an objectionable particulate before the first impact at 142 on the first water surface, steam may be injected in conduit 141 or duct 110. Sufficient flow-through of water input through line 104 and output through line 106 is maintained to remove the collected objectionable particulate from the gas being cleansed and provide fresh liquid for impaction and particle removal.

The device of FIGS. 3 and 4 differs from the device of FIGS. 1 and 2 additionally as follows. First, there are provided successive impactions of the contaminated or polluted gas to be cleansed upon a liquid surface. Yet further, there is provided from one to three ambient air additions or injections into the moving contaminated gas stream after humidification thereof by impaction on the liquid surfaces. Further, in the device of FIGS. 1 and 2 the adjacent ducts and tube sheets are so mounted in the vessel and configured that, in effect, nozzles are provided from which the gas is passed for impaction on the liquid surfaces and, additionally, from which the gas is passed into the ambient air injection zone. The latter configuration provides greater gas-liquid contact on impaction and, additionally, turbulence for mixing with the ambient air.

The dirtier the input gas to be cleaned, generally speaking, the greater number of impactions on the liquid surface is desired to fully knock-out the particulate. The injection or input of the lower temperature ambient air additionally serves to knock-out smaller particulate in cooperation with the liquid surface impaction. The dirtier the input gas to be cleansed, the more humidifications, saturations or near saturations and supersaturations may be worked thereupon to effect the complete cleansing of the gas and removal of objectionable particulate therefrom.

DEVICE OF FIG. 5

Referring to FIG. 5, therein is shown a reactor and device for purification of a polluted gas carrying objectionable particulate matter utilizing two entirely separate and separated liquid bodies for the removal of the particles from said gas stream.

Referring to the drawing, vessel 200 has cylindrical vertical side wall 201, inverted frusto-conical bottom wall 202 and frusto-conical top wall 203. Side wall 201 has liquid inlet fitting 204 thereon preferably positioned below the normal lower liquid body starting level 205. Bottom wall 202 has central liquid drain fitting 202a therein which is suitably valve controlled in conventional manner, as are the outlet fittings 23 of FIG. 1 and 106 of FIG. 4. Side wall 201 additionally has opening 206 therethrough which passes contaminated gas inlet duct 207 having downturned inward end 208 with discharge opening 209 therein.

In the upper portion of the device of FIG. 5 there is provided apparatus as follows. Top wall 203 has opening 210 therethrough which receives effluent duct or tube 211 therewithin. Output conduit 212 having fan or blower 213 therein is positioned above duct 211 with the motor or power source 214 therefor mounted by suitable spiders 215 and driving shaft 216 carrying the fan 213 thereon. Frusto-conical duct 217 is positioned concentrically outboard of effluent duct 211 and carried thereby by suitable spacers 218. The lower end 211a of effluent duct 211 preferably is positioned slightly above a liquid starting level 219 in the upper device being described within vessel 200 and the lower end 217a of duct 217 preferably extends considerably therebelow. Outboard of frusto-conical (inverted) duct 217 there is provided cylindrical tube sheet, tube or duct 220 which is circumferentially fixed at its upper end to the underside of top wall 203. This wall has a lower end 220a normally extending slightly below the starting liquid level 219. Outboard of cylindrical wall 220 is positioned frusto-conical duct 221 which has a laterally slanted bottom wall 222 from which leads outlet line 223 out through opening 224 in side wall 201. Spacers and supports 225 mount outermost duct wall 221 with respect to duct 220 and additional (not seen) supports may be provided connecting same to top wall 203 and/or side wall 200. Input liquid line 226 communicates through outer duct wall 221 below the starting liquid level 219.

The body of water which is maintained in the lower portion of vessel 200 to receive initial particulate from the polluted gas input to vessel 200 and humidify said gas is designated 227. The body of water or other cleansing liquid which is carried inside of wall or duct 221 and bottom wall 222 is designated generally 228.

The zone of vessel 200 surrounding initial input duct 207 and extending up outside of walls 222 and 221 is designated 229. That zone at the top of the vessel inboard of wall 221 and thereabove, outboard of duct 220, is designated 230. The zone 231 between outer wall 221 and duct or wall 220 leads (in sequence of flow and operation of the device) into zone 232 between wall 220 and duct 217. Zone 233 is positioned above and inboard of duct 217 and leads into zone 234 between duct 217 and effluent duct 211. Zone 235, the interior of tube 211 leads into conduit 212.

A plurality of spaced circumferential (to effluent duct 211) openings for ingress of ambient air are provided at 236 inboard of tube or wall 220. A like plurality of circumferential, spaced (from one another) ambient air input openings 237 are positioned outboard of tube or wall 220 and inboard of the upper extension of outer wall 221. A manifold (dotted line showing) 238 may be employed to feed ambient air to the openings 236 and 237 through one or more input pipes or tubes 239. Such air would be blown or forced in by any relatively small power blower or fan. The manifold and means for forcing ambient air in generally are not required in view of the fact that all the polluted gas to be cleansed processed in vessel 200 is drawn through the vessel by fan or blower 213 which, in turn, would draw ambient air, additionally, in through openings 237 and 236. In the event that only one set of openings, either 236 or 237, were desired to be used, the other set would be closed or blocked.

OPERATION - DEVICE OF FIG. 5

The device of FIG. 5 is particularly useful where the input polluted effluent containing objectionable particulate matter has therein, in addition to finer, difficult to remove particulate, more massive particles in considerable quantity. To deal with this particular type of problem where there is both a large quantity of relatively large sized particulate and, additionally, a charge or quantity of finer, harder to remove particulate, the device of FIG. 5 provides for an initial downward impaction into a separate body of water received in the lower portion of vessel 200. This initial impaction effectively permits the removal, and removes, the major portion or all of the large and massive particulate carried into the vessel through line 207. Depending upon the relative quantity present of such particulate, the flow of water or other cleansing liquid in through feed line 204 and out through 205 is regulated so as to provide the desired and necessary quantity of water to adequately receive, absorb and remove this said initial removal of particulate from the polluted or contaminated air stream.

The process will be described with respect to the cleansing of a polluted gas stream which enters vessel 200 through duct 207 at a temperature greater than the boiling point of the liquid bodies 227 and 228 under the conditions of relative rarefaction caused by the operation of fan or blower 213. At atmospheric, it is previously noted, that would be 212° F at sea level.

In operation of the device of FIG. 5, with the liquid bodies 227 and 228 filled to the starting levels 205 and 219, respectively, the fan or blower 213 is energized. This draws the polluted gas to be cleansed (supplied from whatever source such as an industrial process effluent) in through duct 207 and thence through the vessel 200 as will be described. The incoming hot gas, carrying objectionable particulate matter exits opening 209 downwardly into direct impact upon the surface 205a of the water body 227, somewhat deflecting that surface at the point of impact. Heavy particulate matter is caught in the water body 227 and the hot gas stream is humidified, taking up condensable water vapor to near saturation or saturation, lowering the temperature, somewhat, of the hot gas stream. This stream of polluted gas passes into zone 229 and upwardly, drawn by the action of fan 213 over outer wall 221 into zone 230. In zone 230, the continuously flowing circular stream of air receives continuous flow injection of ambient air at a lower temperature than the humidified, near saturated or saturated gas to be cleansed. This ambient air addition highly saturates or supersaturates the gas stream at that point, causing agglomeration and nucleation of particulate matter in the stream to form larger particles. This nucleated gas stream passes downwardly into zone 231 into impaction on the modified level of the water surface at 219a, again becoming humidified to near saturation or saturation and lowering in temperature. This gas stream, at this point, additionally loses nucleated, agglomerated particulate into the water body 228 at this point. The humidified, partially cleansed, gas stream moves up into zone 232 and over the top of outwardly angled (upwardly) wall or duct 217 into zone 233.

In zone 233, again the humidified (for the second time) gas stream is mixed with a continuous input flow of ambient air at a lower temperature drawn or forced through opening 236. This causes, in zone 233, supersaturation, agglomeration and nucleation of the additional particulate matter carried in the gas flow. This nucleated stream, at a lower temperature, moves downwardly into zone 234 to impact upon the modified level 219b of the surface of water body 228 thus to, first, knock-out or lose additional nucleated particulate polluting matter, again humidify and, finally, drop in temperature. The cleansed or substantially cleansed gas then is drawn up into zone 235 in duct 211 by the action of fan or blower 213 passing into discharge conduit 212.

In the even that additional humidification of the input contaminated gas flow is desired, steam may be added in conduit 207 before the first impaction on water surface 205a. Further, in order to continuously remove the objectionable particulate from the water body 228, there is regulated input of clean liquid through fitting 226 and withdrawl of particulate containing liquid through line 223. The angling of ducts or walls 217 and 221 with respect to cylindrical ducts or walls 211 and 220 produces a nozzle-like effect feeding upwardly into zones 230 and 233 and downwardly out of zones 231 and 234. The additional turbulence in zones 230 and 233 (ambient air addition) aids mixing, nucleation and agglomeration, while the additional velocity on impaction at 219a and 219b results in more effective transfer of nucleated and agglomerated particulate into the water, as well as humidification.

DEVICE OF FIG. 6

While the gas of air cleansing devices of the previously described figures are so designed and arranged as to obtain the maximum efficiency and results in a minimum of space, where space is no particular object, the air or gas cleansing device can be of very considerably simpler configuration. These remarks are true of the devices of both FIGS. 6 and 7. In one sense, FIGS. 6 and 7 are schematic diagrams of the processes of the previous figures, as well as the apparatus and devices shown therein.

Referring, then, to FIG. 6 therein is shown an elongate vessel generally designated 300 which is most conveniently rectangular in both vertical and transverse sections. In such configuration, then, the device has end walls 301 and 302 bottom 303 and top wall 304. In FIG. 6, to the left, an inlet or input flow duct 305 is provided and, on the righthand side of the view of FIG. 6, an output or outlet flow duct 306 is provided.

Three substantially vertical wall 307, 308 and 309 are provided fixed to the underside of top wall 304 and extending downwardly therefrom. Walls 307-309, inclusive extend from side wall to side wall (not seen) of the vessel 300, so that all flow from left to right in vessel 300 must pass under each one of these walls. Additionally, three substantially vertical walls 310, 311 and 312 are provided positioned between pairs of the previously mentioned walls 307-309, inclusive and end wall 302. Walls 310-312, inclusive are spaced downwardly from the top wall 304 as shown, but also upwardly from the bottom wall 303. When liquid is present as in liquid body 313 having typical starting level 314, all gas passing through the vessel pass over walls 310-312, inclusive. Walls 310-312, like walls 307-309, inclusive extend side wall to side wall of vessel 300. Walls 307-312, inclusive are preferably spaced equidistant from one another and end walls 301 and 302 as illustrated.

A fan or blower 315 is positioned in outlet duct 306 (or a plurality of such in such fashion as to exert gas drawing force across the entire width of duct 306 if same is not shortened in width). Motor 316, mounted in duct 306 by spider members 317 drives shaft 318 carrying fan 315. Fan or blower 315 draws air through vessel 300 (or gas) from left to right in the view, exhausting cleansed gas or air to the right of the view.

Inlet and outlet liquid lines 319 and 320 are provided below the starting liquid level 314 for replacement and removal of liquid from body 313.

Zones are defined in vessel 300 by the walls and barriers previously described as follows. Zone 321 enters the space between end wall 301 and barrier 307. Zone 322 is between walls 301 and 307, leading downwardly under barrier 307 into zone 323 between barriers 307 and 310. Zone 324 is above barrier 310 leading into downward zone 325. Gas passing through the vessel from left to right passes from zone 325 under barrier 308 into zone 326 and thereafter upwardly over barrier 311 into zone 327. The latter zone leads downwardly into zone 328 ahead of barrier 309 under which gas passes to reach zone 329. From the latter zone, the treated gas passes over barrier 312 into zone 330 and thence into duct 306.

Openings 331 lead into zone 321 prior to a first impaction on a liquid surface passing under barrier 307. Opening 332 lead into zone 324, while openings 333 lead into zone 327. A pipe or conduit 334 (or plurality of same) leads into openings 331 for admission of steam, if desired, into zone 321. A manifold (dotted line showing) 335 fed by one or more conduits or lines 336 may be employed to feed ambient air into sets of openings 332 and 333. In such case, a blower or fan (not shown) will power such ambient air input.

FIG. 6 OPERATION

With the water or cleansing liquid level initially at 314, fan or blower(s) 315 are energized to draw polluted gas containing objectionable particulate matter into conduit 305 and through vessel 300. This polluted gas, in zone 321, if desired, may be partially humidified by addition of steam through openings 331. Alternatively, if sufficient steam has been added to sufficiently humidify the polluted gas stream to saturation or near saturation, ambient air may be added through openings 331 to nucleate or agglomerte same by supersaturation. At any rate, the gas, drawn by fan 315 is drawn downwardly under barrier 307 in impact upon modified surface level 314a. If the gas is dry and hot, it is humidified and cooled, the former to near saturation or saturation. If the gas has already been humidified and received ambient air addition, first particle knock-out will take place into the water surface 314a. In any case, heavier particle knock-out or loss will undoubtedly occur in this zone under barrier 307.

The rising, humidified, cooled gas goes up over the top of barrier 310 where it meets a continuous incoming stream of ambient air which mixes therewith, lowering the temperature of said gas and supersaturating or saturating same whereby to agglomerate and nucleate particulate therein. This gas passes down into zone 325 into impact with the water surface at modified level (under operation) 314b where additional agglomerated, nucleated particulate is lost into water body 313, the gas temperature lowered and the gas humidified. This gas stream then passes up through zones 326 to zone 327 where it is again mixed with a further stream of ambient air. The same process which took place in zone 324 takes place in zone 327 on the particulate remaining in the gas stream, agglomerating and nucleating same, with the gas temperature further lowered.

Thereafter, this gas stream passes down to impaction at modified level 314c where the final particulate loss occurs into water body 313. The gas temperature is lowered and the gas is again humidified. Upwardly the gas stream, cleansed, moves into zone 329 and then over barrier 312. In zone 330, any water or liquid particles large enough will fall out, carrying, if there is any, additional particulate down into the water body at modified level 314d. Thereafter, the cleansed gas exits from conduit 306 driven by fan or blower 315.

DEVICE OF FIG. 7

The air pollution control device of FIG. 7 differs from that of FIG. 6 primarily in two considerations. First, the impaction zones are entirely or substantially separated into isolated, individual chambers. Secondly, the baffles or walls in the chambers which direct the moving flow of contaminated gas being cleansed through the device are so positioned as to create nozzle effects, first, approaching the water surface levels for impaction and, secondly, as the humidified, impacted gas rises to the ambient air addition zones.

Turning, then, to FIG. 7, therein is provided a plurality of separte chambers generally designated 350, 351 and 352. Chamber 350 has end walls 350a and 350b and bottom wall 350c. Chamber 351 has end walls 351a and b and bottom wall 351c. A top wall 352 overlies all three chambers. Connecting walls 354 and 355 (as well as the side walls of the device which are not seen) provide interconnecting ducts between chambers 350 and 351 and 351 and 352, respectively. Input flow duct 356 serves to bring in contaminated air to chamber 350 and output flow duct 357 discharges the cleansed gas from final chamber 352. This device is typically of rectangular vertical and horizontal section for each chamber although they may be cylindrical, etc.

Three downwardly angled walls or barriers 358, 359 and 360 are fixed to the underside of wall 353, extend from side wall to side wall in each of the chambers and extend diagonally downwardly in the chambers as illustrated, whereby to closely approach at their free ends walls 350a, 351a and 352a and in their upward portions the opposite end walls 350b, etc..

A fan or blower 361, driven by motor 362, is positioned in outlet duct 357 to draw the gas to be cleansed (and ambient air) through and into, respectively, the device being described in the gas cleansing process.

Inlet and outlet pipes 363 and 364 are provided in the lower portion of chamber 350 below the bottom extreme or edge of barrier 358 and like inlet and outlet lines 365–368, inclusive are provided for chambers 351 and 352. It should be noted that lines 364 and 365, as well as 356 and 357 may be interconnected so that there is liquid connection (liquid body interconnection) between the separate chambers. With a starting level (not shown) of liquid in all three chambers essentially under or slightly below the bottom edges of barriers 358–360, inclusive, in practice of the process, the water body levels will substantially adjust to those shown, with such interconnection. Alternatively, each chamber may be individually replenished and drained through the inlet and outlet pipes, in which case, the starting level in each chamber will be approximately at the lower edge of the barrier therewithin. This latter option enables higher volume flow-through through, in, for example, chamber 350 in which most of the heavier particulate typically would be removed.

FIG. 7 OPERATION

In operation of the device of FIG. 7, with the individual chambers having been supplied liquid in the lower portions thereof, fan or blower 361 is energized through motor 362 to begin drawing in the contaminated gas containing objectionable particulate to be removed into and through the system illustrated. In chamber 350, in the zone to the left of barrier 358, if desired, steam may be added to humidify the contaminated gas before first impact. Alternatively, if the gas has been previously humidified in duct 356, ambient air may be added before impaction below barrier 358. These options are not shown as they have been shown and described with respect to FIG. 6.

At any rate, the typically hot, contaminated input gas passes downwardly in the zone to the left of barrier 358 and is impacted on the surface of the liquid body 369 in chamber 350. This impacted gas loses some of the larger, heavier particulte in liquid body 359 and is cooled and humidified to saturation or near saturation. Thereafter, it rises into the zone to the right of barrier 358 again being compacted through the nozzle formed between the upper portions of barrier 358 and wall 350b.

As the gas passes out of this nozzles into the duct or zone over wall 354, ambient air is drawn (or, alternatively, forced through a manifold, not seen) into opening 370 by the impetus of fan 361. In the duct above wall 354, the continuous injection of the stream of ambient air lowers the temperature of the humidified gas stream, saturating or supersaturating same and causing agglomeration and nucleation of the particulate matter therein. This treated stream then passes into the wedging or nozle zone defined between wall 351a and barrier 359 in chamber 351 downwardly to impaction on the surface of liquid body 371. At this point, agglomerated, nucleated particulate is discharged or taken up into or by liquid body 371 with the still hot, contaminated, yet partially purged gas further cooled and further humidified to saturation or near saturation.

The gas then rises past barrier 359, drawn by the impetus of fan or blower 361 into the wedging or nozzle zone to the right of barrier 359 in the view emerging into the duct space above wall 355. This emergence is turbulent, caused by the passage through the nozzle immediately preceding this duct. Ambient air is flowed or impelled through opening 372 in top wall 353 further lowering the temperature of the humidified gas, saturating or supersaturating same whereby to cause agglomeration and nucleation for a second time of additional particulate matter in the gas stream being cleansed. This stream, passing into the lefthand portion of chamber 352, moves downwardly, drawn by fan 361 into the nozzle or wedging zone above the water body 373 surface, then impacting thereon. This impact causes particulate matter to be taken up by water body 373, particularly that which was agglomerated and nucleated by the previous ambient air addition. The gas stream is again humidified and the temperature thereof lowered.

Finally, this treated, cleansed and humidified gas stream, much cooled, rises in the righthand portion of chamber 352 and passes into duct 357, thereafter out to atmosphere or to whatever space or environment duct or conduit 357 takes it.

DEVICE OF FIG. 8

The device and system of FIG. 8 relates to the device of FIGS. 1 and 2 as follows. In the first place, it is substantially the precise opposite of the device of FIGS. 1 and 2 in that flow is reversed. That is, the input of the contaminated gas to be cleansed is peripheral of the vessel, with the discharge of the cleansed gas from the center of the vessel. Further, the barriers, walls, tube sheets, tubes or ducts provided within the vessel to form the reversing passageways are so configured that the gas being treated goes through a compacting nozzle immediately prior to impaction on a liquid surface and further passes through compacting nozzles immediately prior to passing into the zones in which ambient air is added. In the former case, better gas-liquid contact is obtained for purposes of transferring contaminated particulate into the liquid body and further in obtaining heat transfer and humidification from the contaminated gas to the liquid body and vice versa. With respect to the other, increased turbulence increases the mixing effect of the ambient air input flow with the humidified, saturated or near saturated gas thus to more effectively achieve thorough saturation or supersaturation for agglomeration and nucleation of the contaminating particulate on molecules of condensable vapor or steam particles.

The device of FIG. 8 compares with that of FIGS. 3 and 4 in that, in both cases, there is a more or less peripheral input of the contaminated gas to be cleansed and a more or less central discharge of the cleansed gas. The device of FIGS. 3 and 4 more effectively more confines the input of the totally uncleansed contaminated gas to a particular zone of the treating device which may be useful when heavier particulate is present in the incoming stream, particularly if subsurface baffling is employed in the type vessel of FIGS. 3 and 4.

Turning to the device of FIG. 8, the reaction or treating vessel is generally designated 400 and has preferably cylindrical, substantially vertical, side wall 401 with inverted frusto-conical lower wall 402 and frusto-conical top wall 403. Bottom wall 402 has central drain fitting 404 therein, as well as input liquid line 405, which is preferably positioned below normal starting liquid level 406. One or more contaminated gas flow conduits 407 penetrates side wall 401 of vessel 400 above liquid starting level 406, preferably closely adjacent the juncture of top wall 403 with side wall 401.

Top wall 403 has central opening 408 therethrough, downwardly through which passes expanding conduit 409 having a lower edge 409a. Concentric sets of ambient air openings 410 and 411 are provided in top wall 403 spaced outwards from opening 408 and duct 409, arranged as will be described. Discharge conduit 412 having fan or blower 413 driven by motor 414 is mounted on the top end of duct 409 operative to draw gas upwardly therefrom.

Two frusto-conical tube sheets 415 and 416, enlarging downwardly, are fixed to the underside of top wall 403, spaced outwardly from effluent duct 409 with the openings 410 and 411 being spaced inboard and outboard, respectively, of tube sheet 415, set 411 inboard of tube sheet 416. Suitable attachments, spacers, supports and the like are provided for the various ducts, tube sheets and barriers, here not shown, to fix same with respect to the outer walls of the vessel and one another. A cylindrical duct or barrier 417 is positioned between effluent duct 409 and inboard tube sheet 415, spaced from each as shown. An outboard, inverted, slightly frusto-conical barrier or duct 418 is provided between tube sheets 415 and 416 extending downwardly to the same extent as barrier 417, namely, always below any liquid level in the vessel which is created by the operation of fan or blower 413.

FIG. 8 OPERATION

With the starting liquid level at approximately 406, fan or blower 413 is energized, drawing gas through vessel 400 inward through duct or ducts 407. The input or inflowed contaminated gas with objectionable particulate may be, if desired, initially humidified with steam. This gas passing into the zone outboard of baffle or sheet 416 is wedged downwardly, and passing therebelow, impacts on modified liquid surface level 406a. Assuming the input contaminated gas is hot, this impact removes some of the heavier, larger particulates, cools the input gas stream and humidifies same to near saturation or saturation.

Passing upwardly from surface 406a, this humidified gas is somewhat compressed between sheet 416 and barrier 418 before discharge into the zone between the upper portions of tube sheets 415 and 416. In this zone, in turbulent mixing, ambient air is added, drawn in through openings 411. This air may be forced in through a manifold-blower system of character previously described (not seen). This continues input ambient air flow cools the humidified gas stream, saturating or supersaturating same, whereby to agglomerate and nucleate particulate matter therein.

The gas stream then passes downwardly between the approaching barrier 418 and tube sheet 415 for a wedging or compacting action prior to impaction on the modified level liquid surface 406b. Again, nucleated, agglomerated particulate is taken up in water body 419, partially cleansing the gas with the said gas stream cooled and again humidified to saturation or near saturation.

Following this second impact, the gas stream moves upwardly into the compacting or wedging zone between tube sheet 415 and cylindrical barrier or duct 417. Emerging from this nozzle in turbulent flow, the partially purged, humidified gas stream is mixed with incoming ambient air drawn or forced through openings 410. There again occurs cooling of this humidified gas producing saturation or supersaturation thereof with agglomeration and nucleation of particulate matter therewithin.

Departing from this ambient air addition zone in downward motion, the gas stream is compacted between the lower end of effluent duct 409a and cylindrical barrier 417, passing thereunder. In the device shown, the lower end 409a of effluent duct 409 has been spaced upwardly sufficiently that the impaction of the gas stream on the modified level water surface 406c is less direct so that, while agglomerated nucleated particulate is absorbed in the water body 419 inboard of barrier 417, the humidification of the gas being drawn out of effluent duct 409 is less.

SPECIFIC EXAMPLE

The following calculations are based on a total gas/air stack volume of 6030 ACFM at 550° F maximum, 4200 ACFM maximum.

1. Cooling required to reduce temperature of vented gas/air volume from 550° F to 212° F:
   a. Weight of gas/air volume at 550° F = (0.03934 lbs./ft.$^3$) × (6030 ACFM) = 237 lbs.
   b. Gas/air volume at 70° F = (372 lbs.) × (13.34 ft.$^3$/lb.) = 3,164 Std. Ft.$^3$/Min.
   c. Enthalpy of gas/air volume at

| 550° F: | 119.2 | BTU/LB |
|---|---|---|
| Same at 212° F: | 37.35 | BTU/LB |
|  | 81.85 | BTU/LB |

2. Water to be evaporated to reduce vented gas/air volume temperature from 550° F to 212° F:
   a. Heat absorbed/lb. of water = 1129 BTU/LB.

(b) Water required = $\frac{19{,}398 \text{ BTU/Min.}}{1129 \text{ BTU/LB}}$ = 17.19 LBS/Min.

c. (17.19 LBS/Min.) ÷ (8.9 LBS/Gal.) = 1.9 Gal./Min.

3. Volume of Evaporated Cooling Water at 212°F:

$$\frac{(379 \text{ ft.}^3/\text{lb./mol})}{(18 \text{ lb/mol})} \times \frac{(460° \text{F} + 212° \text{F})}{(460° \text{F} + 60° \text{F})} \times (17.19 \text{ lbs/min.}) =$$

$$(21) \times \frac{(672)}{(520)} \times (17.19 \text{ lbs./min.}) =$$

$$(21) \times (1.29) \times (17.19 \text{ lbs/min.}) = 466 \text{ Aft.}^3/\text{min.}$$

4. Total volume vented from primary to secondary reaction zone at 212°F:
   a. Weight of gas/air volume = 237 lbs.
   b. Gas/air volume at 70° F = 3,164 St'd Ft.$^3$/Min.

(c) $3164 \text{ Std./Ft.}^3/\text{Min.} \cdot \frac{(212° \text{F} + 460° \text{F})}{(70° \text{F} + 460° \text{F})} + 466 \text{A.Ft}^3/\text{Min}$ 5. Secondary reaction air volume (ambient) at a temperature of 110° F to reduce temperature of humid gas/air volume from 212° F to 180° F (by 32°):

(saturated): $\frac{460° \text{F} + 212° \text{F}}{460° \text{F} + 60° \text{F}} = \frac{672}{520} = 1.29$ $\frac{379 \text{ Ft.}^3/\text{Min.}}{18.0 \text{ lb/mol.}} = 21$ 4548 A.Ft.$^3$/Min. at 212° F ÷ 1.29 = 3,526 Ft.$^3$/Min.
   3,526 Ft.$^3$/Min. ÷ 21 = 167.9 lbs./min. (saturated)
   b. Heat loss in cooling from 212° F to 180° F Enthalpy of gas/air volume at 212° F = 37.35 BTU/lb.

Enthalpy of gas/air volume at 180° F = $\frac{30.00 \text{ BTU/lb.}}{7.35 \text{ BTU/lb.}}$ (168 lbs./min) × (7.35 BTU/lb.) = 1235 BTU/min.
   c. Ambient air volume required at 110° F Enthalpy of gas at 212° F = 37.35 BTU/lb.

Enthalpy of gas at 110° F − $\frac{12.55 \text{ BTU/lb.}}{24.80 \text{ BTU/lb.}}$ Weight of ambient air required:

$$\frac{12.35 \text{ BTU/min.}}{24.8 \text{ BTU/lb.}} = 49.8 \text{ lbs./min.}$$

Air density at 110° F = 0.06968 lbs/min.
Volume of ambient air required = 49.8 lbs/min ÷ 0.06968 lbs./ft.³ = 715 A.Ft.³/Min. 715 A.Ft.³/min. ÷ 4548 = 15.7%

6. total gas/air volume vented to atmosphere at 180° F. Total volume of gas/air vented to secondary

| reaction zone = | 4548 A.Ft.³/Min. |
| Ambient air volume - | 715 |
| | 5263 A.Ft.³/Min. |

(Total gas/air volume at 180° F)

GENERAL CONSIDERATIONS

The baffles, ducts, walls and the like which form the nozzles from which the gas being treated is discharged into impaction with the cleansing liquid or water, under reactor operating and working conditions, should not be submerged. At most, they should be flush with the working water level surface. Preferably, the working water level surfaces are maintained within two diameter equivalents for the nozzle area and necessarily under five diameter equivalents (of the water surface).

The operation of the subject reactors and air pollution control devices has been described in terms of a hot gas being processed or treated in the sense that the incoming temperature of the gas before the first impaction was either over 212° F or at least above the boiling point of the cleansing liquid under the rarefied conditions of operation. As will be later noted in more detail, the operating pressure drop in this type of device only requires 1 to 9 inches of water for effective work, preferably 3 to 9 inches of water pressure drop. The velocity range (which converts into the pressure drop) is preferably in the 4,000 to 12,000 ft./min. range. [A greater velocity and pressure drop is not required in the instant device, as compared to competitive systems which mechanically drive together the particles (through venturis, nozzles, etc.). In such devices, a pressure drop of from three to four times greater and velocities up to 30,000 to 40,000 ft./min., requiring great horsepower, are not unusual. Thus, for example, a velocity of 36,300 ft./min. requires an equivalent 83 inches of water pressure drop.] The conversion of velocity pressures to corresponding velocities may be seen in Table 49 of the North American Combustion Handbook, First Edition, 1952, 1965, North American Mfg. Company, Cleveland, Ohio 44105.

The instant device, as stated, uses far lesser power than venturis and nozzles where the particles and gases are mechanically driven together. The fan horsepower and pressure drop of the instant devices are only required to overcome the friction of the system with a preferred velocity range of 4,000 to 8,000 ft./min., maximum 10,000 to 12,000 ft./min.. Required fan horsepower increases with increase in the weight of air moved and increase of resistance of passage through the device.

The instant process also applies to contaminated gases having objectionable particulate therein which are hotter than the ambient temperature, but less than 212° F or the boiling point of the cleansing liquid under the conditions of rarefaction. Thus, the incoming gas, typically, at a temperature higher than ambient, is passed to the first impaction and humidification with the rising gas typically still over ambient temperature. Then enough ambient air at a lower temperature is added to take the total gas volume in the ambient addition zone below the dew point at the overall conditions existing in the zone. The dew point is the temperature at which condensation begins when the mixture is cooled. Reference is here made to Fan Engineering, Seventh Edition, 1970, R. Jorgenson, Pages 9, 10, 461 and 579, published by Buffalo Forge Company of Buffalo, New York (with respect to dew point conditions and condensation thereat).

I have discovered, in working with contaminated or polluted gases of 125° F or higher that over 10% and optimally at least 15% of ambient air must be added to the contaminated gas being processed in order to achieve the described effects of the instant process. This includes the gases at temperatures only slightly above ambient up to those at very elevated temperatures, at 212° F or considerably higher. A sufficient quantity of ambient air must be added in each ambient addition zone to cause condensation at each zone of input. In the majority of cases, no more than 50% of ambient air ever need be added. Indeed, in the majority of cases, the required quantity is near 15%. The upper limit of addition of ambient air, on a practical basis, is governed by the desire to limit the fan horsepower required. In circumstances where high temperature contaminated gases are cleaned and water is precious, additional ambient air may be added in the treating vessel in order to reduce the water lost from the vessel. In such case, there is a balancing of convenience and efficiency between the cost of the water and the cost of the additional fan horsepower required. The key value or quantity for ambient air addition, is the substantially 15% ambient addition (minimum quantity) to achieve the effect of the instant process. This is total quantity of ambient air added for the total quantity of contaminated gas cleansed.

It is believed that the mechanisms of the instant process are fairly well understood, scientifically and the description, as given previously, in terms of dew point for lower temperature contaminated gas treatment, and saturation and supersaturation with respect to higher temperature gas treatment are substantially accurate. Reference is made to the following scientific literature as giving what is believed to be the proper and accurate description of what is taking place in the instant device in the processing of contaminated gases having objectionable particulate therein utilizing humidification and ambient air addition. Whether these mechanisms truly are mechanisms which are operating in the instant device (devices), part of the mechanisms or all of the mechanisms is not known. What is known is that, when contaminated effluents of the character described are processed in devices of the structure described in the manner of operation described, objectionable particulate from large through very fine ranges are removed from contaminated air or gases.

Thus see the following:

1. Technical Report No. 9 "Particle Size Distribution in Hydroscopic Aerosols", G. R. Gillespie, May 1, 1953, Contract AT(30-3)-28, U. S. Atomic Energy Commission;

2. Industrial and Engineering Chemistry, Volume 44, NO. 6, June, 1952, Pages 1271–1321, inclusive and 1371–1383, inclusive with respect to nucleation theory, review and nucleation from gases, particularly including:
  a. "Nucleation In Phase Transitions" Lamer;
  b. "Liquid And Crystal Nucleations", Pound;
  c. "Theory Of The Liquid Drop Model", Reiss;
  d. "Spontaneous Nucleation In Supersaturated Water Vapor", Rodebush;
  e. "Nucleation Catalysis", Turnbull et al;
  f. "The Diffusion Cloud Chamber", Langsdorf;
  g. "Formation of Ice Crystals In Ordinary And Nuclei-Free Air", Schaefer;
  h. "Impaction Of Dust And Smoke Particles On Surface And Body Collectors", Ranz.

Generally speaking, independent of the temperature of the input contaminated gas to be cleansed, the smaller the particles, the more impactions and ambient air additions (alternative and sequential) are required. Still further, the cooler the gas (with respect to ambient) the more time and work required in terms of impactions and ambient additions will be required thereon because the impaction-humidifications will not be as efficient and the temperature differentials between the ambient and the humidified gas is not as great so the condensations or supersaturations are less massive. Nevertheless, the instant process, for example, applied to 140° F input contaminated gas having particles in the one micron range will effectively function (and has) to cleanse the gas and knock-out such opacity. The hotter the input gas, the greater the problem of taking the steam generated by the impact-humidifications out before leaving the vessel. This, as previously noted may particularly require the use of additional ambient air to condense out the steam or water vapor. In a device as seen in FIG. 1, the ambient, in such case, might even be added into the outer zone 61 for condensation purposes. Likewise, in the device of FIG. 6, ambient addition might additionally be made in the zone above baffle 312.

The device of FIG. 4 differs from that of FIG. 8 in that FIG. 4 readily can be made portable. The specific device illustrated in FIGS. 3 and 4 actually illustrates the instant improvement incorporated into a large oil drum construction. Merely by providing a sufficiently larger diameter outer vessel (walls 100–103, inclusive) with a plurality of input ducts 110 and reversing passageway systems (ducts 109, 111, 112, 115, 116, 117 and fans 121) therein, the device of FIGS. 3 and 4 may be operated parallel. Said otherwise, pulling out top wall 103 with the associated apparatus permits the air processing equipment to be inserted over or into other receiving vessels of varying size, provided adaptation and sealing means for lid 103 are present with respect to such other vessel.

Also in FIGS. 3 and 4, it is not necessary for the set of ambient air openings 136 to be precisely positioned over the top of baffle 117. In the device of FIGS. 3 and 4, the provision of a lesser diameter input duct causes a greater impaction at 142 for knock-out of large particles at that impact zone. The greater diameter outlet duct 109 causes a lesser output flow velocity for a given volume of gas input through duct 110 whereby there is less vapor carryover. The latter is particularly important where cleansing water is expensive or hard to get. The reference is to condensable vapor carryover after the humidification at 145. Additionally, to lessen such last humidification, the effluent duct 109 may be shortened to end a greater distance above the surface 145 so less impact is experienced. Thus see the relative positions of lower ends 409*a* (FIG. 8) and 211*a* (FIG. 5) for ducts 409 and 211.

The liquid levels in the stages of FIGS. 1 and 4, in operation, should reflect or approximate the pressure drop across the stages as is seen in the other FIGS. 5–8, inclusive.

Generally speaking, it is convenient to provide the cross-sectional area of all the nozzles for impaction on the water surface of equal area. In the device of FIG. 1, since the gas cools as it moves outwardly through the vessel, this would mean a lowering of gas velocity through the outer nozzle moving out of zone 60. If it is desired to have uniform velocity at all the nozzles, they would then be reduced in cross-sectional area outwardly (FIG. 1). As previously noted with respect to the device of FIGS. 3 and 4, enlarging the opening 36 through the wall of vessel 20 and conduit 37 leading to conduit 38 causes a lower exit velocity which will reduce vapor carryover at higher air velocity through the vessel. Again, the outer baffle or duct 29 may be shortened to space the outer nozzle, in FIG. 1, upwardly from the water surface 52, as well as enlarged, if there is any water carryover problem. Still further in FIG. 1, ambient air addition above zone 61, as noted, may be employed for condensation in that zone to knock-out condensable water vapor, steam particles, etc..

It is extremely difficult, if not impossible, to obtain effective fine particle removal results on contaminated gases without having a minimum of three water surface impactions and two ambient air additions following each of the first two cleansing liquid or water surface impactions. The final impaction is for final condensate and particulate removal. This particularly refers to particles of six microns and less. This requires a minimum of six chambers (FIG. 7 in line and FIGS. 1 and 8, concentric). FIG. 5 obtains the necessary operations in five chambers. The concentrically arranged devices (other than FIGS. 6 and 7) are by far the most efficient and require the least space to achieve a given result.

Particularly with respect to corrosive and/or high temperature and/or highly polluted gases to be cleansed, my device is far preferable with a fan or blower on the output, thus positioned in or subjected only to the cleansed gas stream. Further, it is not desired to agitate and break-up the impaction water surfaces to where discrete, macroscopic liquid particles would be carried in the stream. The presence of spray or discrete mist or rainlike particles destroys the effectiveness of the instant system. Only that impaction which achieves the desired humidification (condensable vapor or steam effect), as well as pick-up (by the cleansing liquid body) of agglomerated, nucleated particulate is desired or necessary. Higher velocities and pressure drops than those set forth above and submergence of the baffle ends in the cleansing liquid body tend to create such nondesirable, reaction quenching effects. By the latter is meant generation or production of discrete spray, mist or foglike particles, which effects will quench the processes here desired.

I produce two basic reaction zones. The primary reaction zone is that area where the gases to be cleansed impinge upon the liquid to humidify or generate a condensable vapor as well as to start gas temperature reduction. Additionally, larger particulates are knocked out in this zone (in the first impaction), typically in the above five micron range. The secondary reaction zone is the ambient air addition zone effecting particulate less than five microns, where the humidified, partially saturated or saturated gases are subjected to ambient air at velocities of at least 4000 ft./min. to start the condensing and particle agglomeration process. Too much liquid in the moving gas stream particularly kills the humidification balance in processes below 212° F and kills the vapor in the vapor phase above 212° F. As the particulate agglomerates, one particle with the other, solid on solid or solid on liquid, they get larger and, on impingement onto the next liquid surface, are taken up thereby.

Thus, typically, in the device as shown, the gases make at least five 180° changes in direction through the system and at each turn, agglomerated particulates are treated, either by discharge into the liquid (three times) or addition of ambient air (two times) before discharge of the gas being treated to atmosphere. Some of the agglomerated particles, remaining entrained in the gases as they move through the vessel, are impinged on the walls of the ducts and the top of the reactor for knock-out in that manner.

The basic process involves the removal of objectionable particulate from a gas stream contaminated by the particulate. The particulate-containing, contaminated gas stream must be humidified to a sufficient degree that the addition of ambient air at a lower temperature thereto will cause the small diameter contaminant particles therein to condense, agglomerate or nucleate to greater size particles which then can be removed from the stream. The literature seems to indicate (Gillespie, supra) that the humidity of the air stream must be in the range of at least 78% (relative humidity). The addition of the sufficient quantity (15% or greater) of relatively lower temperature ambient air in the velocity range indicated appears to cause growth of the particulate by condensation of water vapor on the surface of the nucleus of the particle and by coagulation of the particles. Certain it is that the enlarged particles can be removed from the humidified, ambient-air-receiving gas stream by impaction on a following cleansing liquid surface as described. The humidification, to the extent of providing or generating necessary condensable vapor is performable by the initial liquid surface impaction as previously described and illustrated. The successive and sequential impactions and ambient additions remove the smallest contaminating particulate.

It must be kept in mind that "the diameter of a large molecule of vapor will probably not exceed 0.0003 microns" - Buffalo Forge, Fan Engineering, Page 576.

In addition to the great reduction in the required horsepower, the instant device eliminates the requirement of sprays, fog generators and the like which, used in the instant devices, would impede or destroy the necessary operating process.

From the foregoing, it will be seen that this invention is one well adapted to attain all of the ends and objects hereinabove set forth together with other advantages which are obvious and which are inherent to the process.

It will be understood that certain process features, steps and sub-combinations thereof are of utility and may be employed without reference to other features, steps and process subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A process of treating hot, polluted gas having particulate matter therein, which hot, polluted gas is at a temperature substantially above ambient air temperature, comprising the steps of:

sequentially twice drawing a continuous stream of the polluted gas downwardly to impact against the surface of a body of water, thereby to substantially saturate and humidify the hot gas stream, each time while passing the gas stream under a separate barrier subsequent to each impact, each barrier closely approaching the water body surface, with the said humidified, polluted gas stream being drawn upwardly between said impacts into an ambient air addition zone, each impaction serving both to humidify the hot polluted gas stream and remove some of the larger particles carried thereby therefrom, continuously mixing ambient air having a lower temperature than that of the humidified, particulate carrying, polluted gas stream with the said gas stream in said ambient air addition zone between the impacts thereof on the surface, sufficient ambient air being added to said gas stream in said zone to take the total gas volume in the ambient air addition zone below the dew point at the overall temperature and pressure conditions existing in said zone, thereby transforming the said humidified, polluted gas stream from a state of substantial saturation to supersaturation with nucleation and agglomeration of the particulate matter therewithin into larger particles, all of the said operations on said hot polluted gas stream taking place within continuously connected, confined spaces, whereby the drawing of said stream therethrough creates a rarefaction which somewhat lowers the boiling point of the water.

2. A process as in claim 1 wherein the incoming polluted gas stream before the first impaction is already humidified and including the step of adding ambient air to the stream of humidified, polluted gas prior to the first impact.

3. A process as in claim 1 wherein the second barrier is in contact with the liquid body surface.

4. A process of treating hot, polluted gas having particulate matter therein, which hot, polluted gas is at a temperature substantially above ambient air temperature, comprising the steps of:

sequentially thrice drawing a continuous stream of the polluted gas downwardly in impact against the surface of a body of water, thereby to substantially saturate and humidify the hot gas stream, each time while passing the gas stream under a separate barrier subsequent to each impact, each said barrier closely approaching the water body surface, with the said humidified, polluted gas stream being drawn upwardly between each of said impacts before being returned downwardly for the next impact, each impaction serving both to humidify the hot polluted gas stream and remove some of the larger particles carried thereby therefrom, and continuously mixing ambient air having a lower temperature than that of the humidified, particulate carrying, polluted gas stream with the said gas stream in an ambient air addition zone between the first and second impacts thereof on the surface, sufficient ambient air being added to said gas stream in said zone to take the total gas volume in the ambient air addition zone below the dew point at the overall temperature and pressure conditions existing in said zones, thereby transforming the said humidified, polluted gas stream from a state of substantial saturation to supersaturation with nucleation and agglomeration of the particulate matter therewithin into larger particles, all of the said operations on said hot polluted gas stream taking place within continuously connected, confined spaces, whereby the drawing of said stream therethrough creates a rarefaction which somewhat lowers the boiling point of the water.

5. A process as in claim 4 wherein the incoming polluted gas stream before the first impaction is already humidified and including the step of adding ambient air to the stream of humidified, polluted gas prior to the first impact.

6. A process as in claim 4 wherein the third barrier is in contact with the liquid body surface and the second barrier very closely approaches the surface.

7. A process as in claim 4 including additionally continuously mixing ambient air with said stream in a second ambient air addition zone between the second and third impacts thereof on the surface, sufficient ambient air being added to take the total gas volume in the said second ambient air addition zone below the dew point at the overall conditions existing in said zone.

8. A process of treating a hot, polluted gas containing particulate matter therein, which hot, polluted gas is at a temperature substantially above ambient air temperature, comprising the steps of:

continuously drawing a stream of said polluted gas through an enclosed vessel having inlet and outlet gas flow lines wherein, through reversing passageways in said vessel, the polluted gas stream is sequentially twice impacted downwardly on the surface of at least one body of water contained in the vessel, each time while passing the gas stream under a separate barrier subsequent to each impact, each barrier closely approaching said water body surface, thereby to substantially saturate and humidify the hot gas stream, with the said polluted gas stream being drawn upwardly between said impacts into an ambient air addition zone, each impaction serving both to humidify the hot polluted gas stream and remove some of the larger particles carried thereby therefrom, continuously adding ambient air having a lower temperature than that of the humidified, particulate carrying, polluted gas stream to the said stream in said separate ambient air addition zone in said vessel between said impacts thereof on the surface, sufficient ambient air being added to said gas stream in said ambient air addition zone so as to take the total gas volume in the said ambient air addition zone below the dew point at the overall temperature and pressure conditions existing in said zone, thereby transforming the said humidified, polluted gas stream from a state of substantial saturation to supersaturation with nucleation and agglomeration of the particulate matter therewithin into larger particles, the drawing of said stream through said enclosed vessel creating a condition of rarefaction which somewhat lowers the boiling point of the water.

9. A process as in claim 8 wherein the drawing of said stream through said vessel is accomplished by a fan on the vessel outlet line.

10. A process as in claim 8 wherein the ambient air is brought into contact with the gas stream by blower means forcing same into said vessel.

11. A process of treating a hot, polluted gas containing particulate matter, which hot, polluted gas is at a temperature substantially above ambient air temperature, comprising the steps of:

continuously drawing a stream of said polluted gas through an enclosed vessel having inlet and outlet gas flow lines thereon, wherein, through reversing passageways in said vessel, the polluted gas stream is sequentially thrice downwardly impacted on the surface of at least one body of water contained in the vessel, each time while passing the gas stream under a separate barrier subsequent to each impact, each barrier closely approaching the water body surface, thereby to substantially saturate and humidify the hot gas stream, with the said humidified, polluted gas stream being drawn upwardly between said impacts into ambient air addition zones, each impaction serving both to humidify the hot polluted gas stream and remove some of the larger particles carried thereby therefrom, continuously adding ambient air having a lower temperature than that of the humidified particulate carrying polluted gas stream to the said stream in said ambient air addition zone in said vessel between the first and second impacts, sufficient ambient air being added to said gas stream in said zone to take the total gas volume in the ambient air addition zone below the dew point at the overall temperature and pressure conditions existing in said zone, thereby transforming the said humidified, polluted gas stream from a state of substantial saturation to supersaturation with nucleation and agglomeration of the particulate matter therewith into larger particles, the drawing of the said stream through said enclosed vessel creating a condition of rarefaction which somewhat lowers the boiling point of the water.

12. A process as in claim 11 including continuously adding ambient air to the said stream in a second ambient air addition zone in said vessel between the second and third impacts, sufficient ambient air being added in said second ambient air addition zone to take the total gas volume in said second ambient air addition zone below the dew point at the overall conditions existing in said zone.

13. A process as in claim 11 wherein the contaminated gas stream is drawn through said vessel by a fan connected to the outlet of the vessel.

14. A process as in claim 11 wherein the ambient air is brought into contact with the gas stream by blower means forcing same into said vessel.

15. A process of treating a hot, polluted gas containing particulate matter, which hot, polluted gas is at a temperature substantially above ambient air temperature, comprising the steps of:

providing two enclosed chambers, each having gas inlet and outlet and a water body in the lower portion thereof and having gas flow communication therebetween above the water levels therein, drawing the polluted gas to be cleaned in a continuous, enclosed stream into a first one of said chambers and therethrough above the water level therein, thereafter into the second chamber, and therethrough above its water level and thereafter out of said second chamber, within each said chamber drawing said polluted gas under a barrier closely approaching the surface of the water body therein an enclosed path, first downwardly to impact upon the water body surface and thereafter laterally under said barrier, thereby to substantially saturate and humidify the hot gas stream, and then upwardly from said impact to exhaust from said chamber, each impaction serving both to humidify the hot polluted gas stream and remove some of the larger particles carried thereby therefrom, drawing air into said gas stream in an ambient air addition zone as it passes from the first to the second chamber, sufficient ambient air being added to said gas stream in said zone to take the total gas volume in the ambient air addition zone below the dew point at the overall temperature and pressure conditions existing in said zone, thereby transforming the said humidified, polluted gas stream from the state of substantial saturation to supersaturation with nucleation and agglomeration of the particulate matter therewithin into larger particles, the drawing of said stream through said enclosed chambers creating a condition of rarefaction which somewhat lowers the boiling point of the water.

16. A process as in claim 15 wherein the incoming polluted gas stream to the first chamber before the first impaction is already humidified and including the step of adding ambient air to the stream of humidified, polluted gas prior to the first impact.

17. A process as in claim 15 wherein the polluted gas stream is drawn through said chambers by a fan connected to the outlet of the second chamber.

18. A process as in claim 15 wherein the ambient air is brought into contact with the gas stream by blower means forcing same into said gas stream.

19. A process of treating a hot, polluted gas containing particulate matter, which hot, polluted is at a temperature substantially above ambient air temperature, comprising the steps of:

providing three enclosed chambers each having a gas inlet and outlet and a water body in the lower portion thereof and having gas flow connections between a first and second and the second and third ones thereof above the water levels therein, drawing the polluted gas to be cleaned in a continuous enclosed stream into the first of said chambers, therethrough above the water level therein, thereafter into and through the second chamber above its water level and thereafter into, through and out of the third chamber above its water level, within each said chamber drawing said polluted gas under a barrier closely approaching the surface of the water body therein in an enclosed path, first downwardly to impact upon the water body surface and thereafter laterally under said barrier, thereby to substantially saturate and humidify the hot gas stream, and upwardly from said impact to exhaust from said chamber, each impaction serving both to humidify the hot polluted gas stream and remove some of the larger particles carried thereby therefrom, drawing ambient air having a lower temperature than that of the humidified, particulate carrying, polluted gas stream into said gas stream in an ambient air addition zone as it passes from the first to the second chamber, sufficient ambient air being added to said gas stream in said zone to take the total gas volume in said ambient air addition zone below the dew point at the overall temperature and pressure conditions existing in the zone, thereby transforming the said humidified, polluted gas stream from a state of substantial saturation to supersaturation with nucleation and agglomeration of the particulate matter therewithin into larger particles, the drawing of said polluted gas stream through said enclosed chambers and gas flow connections therebetween creating a condition of rarefaction therewithin which somewhat lowers the boiling point of the water.

20. A process as in claim 19 wherein the incoming polluted gas stream is already humidified before the first impaction and including the step of adding ambient air to the stream of humidified, polluted gas prior to the first impact.

21. A process as in claim 19 wherein the polluted gas stream is drawn through said chambers by a fan connected to the outlet from the third chamber.

22. A process as in claim 19 wherein the ambient air is brought into contact with the gas stream by blower means forcing same into said gas stream.

23. A process as in claim 19 including the step of additionally drawing ambient air into said gas stream in a second ambient air addition zone as it passes from the second to the third chamber, sufficient ambient air being added to take the total gas volume in the second ambient air addition zone below the dew point at the overall conditions existing in said zone.

24. A gas scrubber for scrubbing hot, polluted gas containing particulate matter, which hot, polluted gas is at a temperature substantially above ambient air temperature, comprising, in combination:

a pair of enclosed chambers each having a body of water in the lower portion thereof, a substantially vertical wall in each chamber dividing at least the upper portion of the space over the water body therein into two zones, each said wall closely approaching the surface of the water body in each chamber with its lowermost extremity, the upper portion of one zone of each chamber having a gas inlet and the upper portion of the other zone of each chamber having a gas outlet, a gas flow duct connecting the gas outlet of a first one of said chambers and the gas inlet to the second of said chambers, an ambient air inlet opening into said gas flow duct and in communication with a source of ambient air, and means for continuously drawing said hot, polluted gas through said chambers from the gas inlet to the first chamber to the gas outlet of the second chamber, thereby to substantially saturate and humidify the hot gas stream in each chamber, and further drawing sufficient ambient air through said inlet opening into said flow duct that the total gas volume in said flow duct is taken below the dew point at the overall temperature and pressure conditions existing therein, thereby transforming the said humidified, polluted gas from a state of substantial saturation to supersaturation with nucleation and agglomeration of the particulate matter therewithin into larger particles, said means for continuously drawing said gas also operative to create a condition of rarefaction in said chambers which somewhat lowers the boiling point of the water therein.

25. A gas scrubber as in claim 24 wherein the gas and ambient drawing means comprises a fan connected to the gas outlet of the second chamber.

26. A gas scrubber as in claim 24 further including means for blowing said ambient air into said gas flow duct.

27. A gas scrubber for scrubbing hot, polluted gas containing particulate matter, which polluted gas is at a temperature substantially above ambient air temperature, comprising, in combination, three enclosed chambers each having a body of water in the lower portion thereof, a substantially vertical wall in each chamber dividing at least the upper portion of the space over the water bodies therein into two zones, each said wall closely approaching the surface of the water body in each chamber with its lowermost extremity, the upper portion of one zone of each chamber having a gas inlet and the upper portion of the other zone of each chamber having a gas outlet, two air flow ducts connecting, respectively, the gas outlets of first and second ones of said chambers with the gas inlets of the second and third ones of said chambers, whereby to provide a sequential series flow of gas through the three chambers and the zones thereof, an ambient air inlet opening into the air flow duct connecting the outlet of the first and inlet of the second chambers and in communication with a source of ambient air and means for continuously drawing said hot, polluted gas through said chambers through the gas inlet to the first chamber to the gas outlet of the third chamber, thereby to substantially saturate and humidify the hot gas stream in each of said chambers, and further drawing sufficient ambient air through said inlet opening into said air flow duct that the total gas volume in said air flow duct is taken below the dew point at the overall temperature and pressure conditions existing in said duct, thereby transforming the said humidified, polluted gas stream from a state of substantial saturation to supersaturation with nucleation and agglomeration of the particulate matter therewithin into larger particles, said means for drawing said hot polluted gas through said chambers also creating a condition of rarefaction which somewhats lowers the boiling point of the water in each of the chambers.

28. A gas scrubber as in claim 27 wherein the gas drawing means comprises a fan connected to the gas outlet of the third chamber drawing gas through the chambers.

29. A gas scrubber as in claim 27 further including means for blowing said ambient air into said gas flow duct.

30. A gas scrubber as in claim 27 including a second ambient air inlet into the air flow duct connecting the outlet of the second and the inlet of the third chambers, said means for drawing gas through said chambers and drawing ambient air through the inlet opening into the air flow duct between the first and second chambers also operative to draw sufficient ambient air through said second inlet opening into the air flow duct between the second and third chambers so that the total gas volume in the duct between the second and third chambers is taken below the dew point at the overall conditions existing in said duct.

* * * * *